No. 789,315.

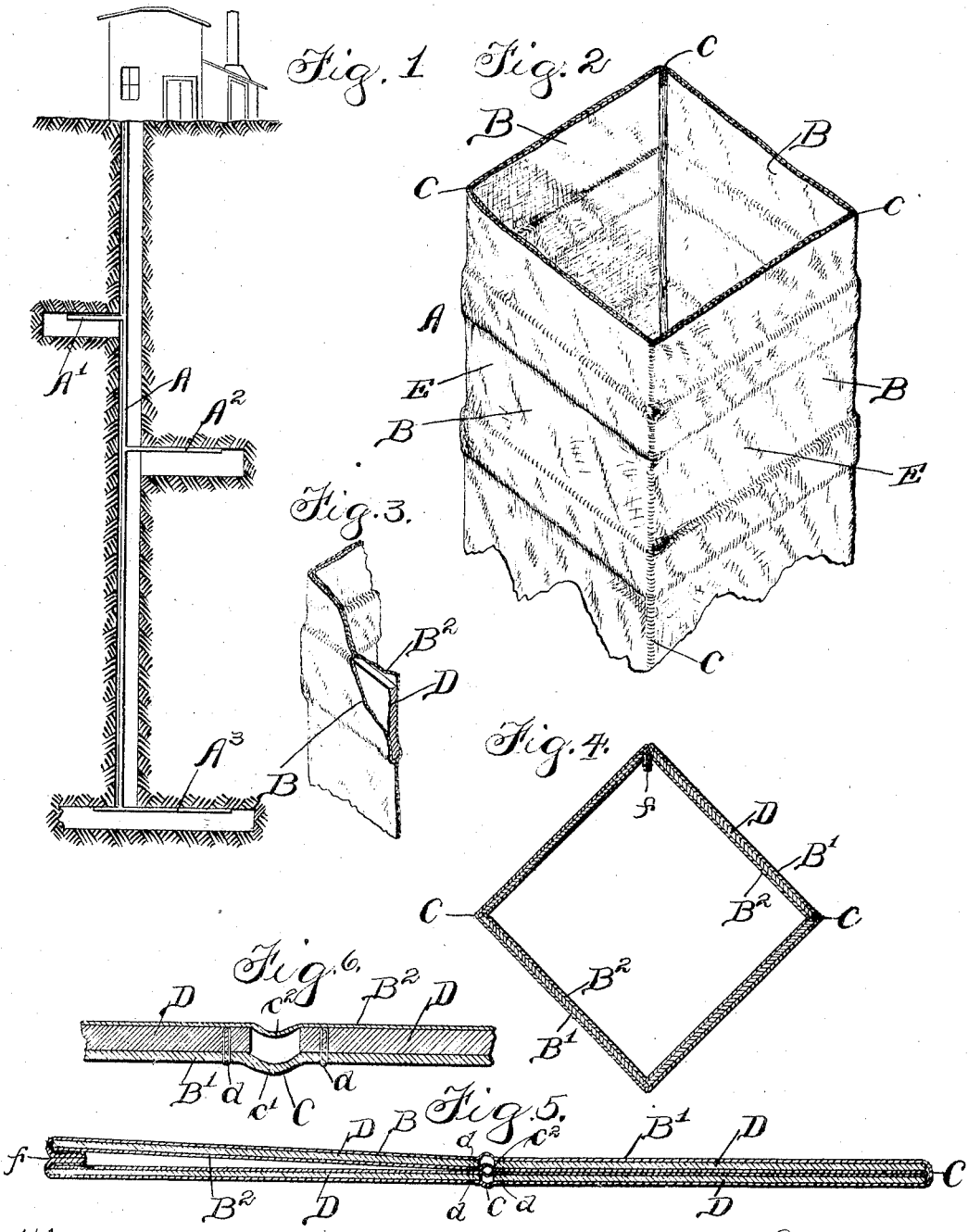

Patented May 9, 1905.

UNITED STATES PATENT OFFICE.

OLOF HJALMAR BERGSTROM, OF BUTTE, MONTANA.

COLLAPSIBLE VENTILATOR-HOSE.

SPECIFICATION forming part of Letters Patent No. 789,315, dated May 9, 1905.

Application filed January 30, 1904. Serial No. 191,300.

*To all whom it may concern:*

Be it known that I, OLOF HJALMAR BERGSTROM, a citizen of the United States, residing at Butte, in the county of Silverbow and State of Montana, have invented a new and useful Collapsible Ventilator-Hose, of which the following is a specification.

This invention relates to collapsible ventilator-hose.

The object of the invention is to provide a flexible tube or hose which can be folded into convenient shape for handling or transportation and subsequently expanded to form a ventilating-tube of straight and uniform section.

A further object of the invention is to provide a simple, cheap, and easily-constructed device which shall embody the foregoing principles.

To these ends my invention consists substantially in the construction, combination, location, and arrangement of parts, all as will be more fully hereinafter set forth, as shown in the accompanying drawings, and finally pointed out in the appended claims.

For the purpose of ventilating mines and other places it is customary to make use of a pipe or hose through which air may be either supplied to or exhausted from the mine, and it is often desirable that such a pipe or hose be removable—that is to say, capable of being transported from place to place and subsequently set up in any desired installation in either a permanent or temporary manner. It is further desirable that the hose or pipe be of such structure as to assume and maintain its expanded form readily, so that its sectional area will be ample and uniform throughout its length and independent of any air-pressure within the tube. Inasmuch as the pressure within the tube is never very greatly in excess of that of the surrounding atmosphere and may be less than such outside pressure, it is highly important that the hose or pipe be so constructed as to remain fully expanded by reason of its structural design rather than by any dependence upon the air-pressure within.

Referring to the accompanying drawings, and to the various views and reference-signs appearing thereon, Figure 1 is a sectional view showing a ventilator-shaft for a mine with a hose or pipe embodying the principles of my invention applied thereto. Fig. 2 is a perspective view showing a section of a hose or pipe embodying the principles of my invention. Fig. 3 is a detail perspective view showing certain features of construction of the hose or pipe illustrated in Fig. 2. Fig. 4 is a transverse sectional view of the same. Fig. 5 is a similar view showing the hose or pipe in its collapsed relation. Fig. 6 is a detail sectional view showing one of the corner-joints of the hose or pipe embodying the principles of my invention.

Throughout the different figures of the drawings the same part is designated by the same reference-sign.

Reference-sign A designates a hose or pipe having side walls B and flexible connections C at the adjacent edges of the side walls. There may be any suitable number of the side walls B, and the same may have either a plane or curved form, whereby the resultant pipe will be either polygonal or of any desired section. I have shown four such side walls B, each having a substantially flat or plane shape, so that the resultant hose or pipe takes a rectangular or quadrilateral form.

The flexible connections C comprise hinges or fabric or any other form of joint or connection whereby the sides B can be folded toward one another and the resultant tube made to assume a collapsed or flat relation. In the particular construction which I have illustrated in the drawings either pair of opposite corners or flexible connections C may be pressed toward one another and the hose or pipe made to assume a rhomboidal form, which eventually becomes entirely collapsed and flat, as illustrated in Fig. 5. It is of course obvious that any other number of sides B would cause the tube to become flattened differently. The adjacent sides B may also be of unequal length, if desired, so as to produce a rectangular pipe for any special purpose.

D designates strengthening-ribs incorporated in the structure of the side walls B for the purpose of imparting additional rigidity thereto. I have shown the ribs D in the form of transverse bars disposed in parallel relation upon each one of the sides B throughout the entire length thereof. The bars D are separated by intermediate spaces E, which are preferably of flexible material.

In the preferred construction of my device I form the side walls B of flexible material or fabric and attach the strengthening ribs or bars D thereto, whereby the material of the fabric forms a flexible connection between the separate bars D.

B' designates an outer flexible wall, of canvas or fabric or any other flexible material, which extends entirely around the hose or pipe and forms a portion of each of the walls B.

$B^2$ designates an inner wall, of any suitable fabric, preferably muslin or cotton fabric of a lighter grade than the fabric B'. The fabric $B^2$ extends entirely around the hose or pipe on the inside thereof and is stitched or cemented or otherwise attached to the wall B' to form a unitary structure. By this arrangement the strengthening ribs or bars D may be included between the separate portions B' and $B^2$ of the wall; but it is to be understood that this is merely a convenient form of construction, and I do not desire to be limited or restricted thereto.

Reference-letter $d$ designates the stitches, which may be taken through the outer wall B' and the strengthening-bar D to hold the parts properly together. It is obvious that these stitches may extend entirely through both of the walls B' and $B^2$, if desired.

In Figs. 5 and 6 I have illustrated a convenient construction by which the flexible joint C can be obtained. In this form of my invention I leave a portion of the flexible walls B' and $B^2$ loose between the strengthening-ribs D, as shown at $c'$ and $c^2$. This allows a proper amount of play or flexibility between the parts, so that they can be folded together and the tube collapsed in the manner above set forth. Reference-letter $f$ designates a stitched or cemented or any other suitable connection for the terminal edges of the walls B' and $B^2$. It is obvious, however, that these terminal edges may be made to occur at different corners of the hose or pipe or somewhere in the body of the sides thereof.

The strengthening ribs or bars D of the different side walls are preferably in alinement with one another, whereby when the hose or pipe is collapsed the latter may be folded or rolled lengthwise into a compact form.

The operation of my device will be clear from the preceding description. The hose or pipe is rolled or packed into a small compass for the purpose of transportation by first collapsing the same into a flattened form, as shown in Fig. 5, and subsequently rolling or folding it lengthwise into a compact bundle, the flexible spaces of the side walls between the ribs or bars D permitting this lengthwise rolling or folding to take place. When it is desired to use the hose or pipe, the latter is unrolled and expanded, so that it assumes the form of a substantially straight and uniform tube adapted to the use of ventilating purposes. In Fig. 1 I have illustrated such a hose or pipe employed for the purpose of ventilating a mine or shaft, and in this case a main section A may be made to extend downward through the ventilating-shaft, while offset sections A', $A^2$, and $A^3$ extend off into the various lodes or tunnels. The air may be either supplied to or exhausted from the mine by means of my device, since it will maintain its expanded form entirely independent of the air-pressure within. The device is adapted for use in ships, cellars, buildings, tunnels, and in all places where a ventilating-pipe is required.

While I have set forth a particular construction embodying the principles of my invention, its function, purpose, and mode of operation, it is obvious that various changes would readily occur to persons skilled in the art and still fall within the spirit and scope of my invention. I do not desire, therefore, to be limited or restricted to the particular details of construction shown and described; but, Having now set forth the object and nature of my invention and a construction embodying the principles thereof, what I claim as new and useful and of my own invention, and desire to secure by Letters Patent, is—

1. A collapsible hose or pipe comprising side walls, and intermediate flexible connections therefor, as and for the purpose set forth.

2. A collapsible hose or pipe comprising side walls having stiffening material embodied therein, and flexible connections for said walls, as and for the purpose set forth.

3. A collapsible hose or pipe comprising a plurality of side walls, and fabric connections at the adjacent edges thereof, as and for the purpose set forth.

4. A collapsible hose or pipe comprising a tube of flexible material or fabric, with stiffening material embodied therein to form a plurality of side walls or faces, as and for the purpose set forth.

5. A collapsible hose or pipe comprising flexible material or fabric arranged to form a tube and having strengthening ribs or bars embodied therein and operating to hold the same normally in distended condition but permitting the tube to be collapsed, as and for the purpose set forth.

6. A collapsible hose or pipe comprising side walls of flexible material, strengthening ribs or bars embodied therein, and flexible connections at the adjacent edges of the side walls, as and for the purpose set forth.

7. A collapsible hose or pipe comprising a plurality of side walls having flexible connections at their adjacent edges, and a series of transverse ribs or bars embodied in each wall, as and for the purpose set forth.

8. A collapsible hose or pipe comprising a plurality of side walls of flexible material having transverse ribs or bars attached thereto, and flexible corner connections for said side walls, as and for the purpose set forth.

9. A collapsible hose or pipe comprising a plurality of side walls of flexible material, flexible connections therefor, and a transverse rib or bar attached to each wall, the said ribs or bars being in alinement with one another, as and for the purpose set forth.

10. A collapsible hose or pipe comprising side walls, and flexible connections therefor, the side walls being composed of inner and outer layers of fabric, and strengthening ribs or bars inclosed between said layers, as and for the purpose set forth.

11. A collapsible hose or pipe comprising four side walls, and flexible connections therefor, the said side walls having strengthening ribs or bars attached thereto, whereby the hose or pipe has a quadrilateral section when expanded, as and for the purpose set forth.

12. A collapsible hose or pipe comprising a plurality of side walls of flexible material or fabric, flexible connections therefor, and transverse ribs attached to said side walls and separated by intermediate spaces, whereby the hose or pipe may be collapsed and folded longitudinally, as and for the purpose set forth.

13. A collapsible hose or pipe comprising a tube of fabric, strengthening ribs or bars embedded therein and extending in separate series around the tube, the ends of said ribs or bars being separated, whereby a flexible connection is obtained, as and for the purpose set forth.

14. A collapsible hose or pipe comprising inner and outer walls of fabric, strengthening ribs or bars embedded between said walls and connected to one of the walls by stitches, said strengthening-ribs operating to normally hold said tube in distended form, but permitting the same to be collapsed, as and for the purpose set forth.

15. A collapsible hose or pipe comprising four side walls of flexible material or fabric having integral intermediate corner connections, and a plurality of strengthening ribs or bars secured to each side wall by stitches, and an inner wall composed of fabric cemented to said strengthening ribs or bars and to the outer wall, as and for the purpose set forth.

16. A collapsible hose or pipe having a plurality of side walls and corner connections, all formed from a continuous piece of fabric, and strengthening ribs or bars attached to each side wall, the corresponding bars in adjacent walls being in alinement with one another, as and for the purpose set forth.

17. A collapsible hose or pipe, a plurality of side walls and corner connections, all formed of a continuous piece of fabric, strengthening ribs or bars in each wall, the corresponding bars being separated, whereby a flexible corner connection is provided for, as and for the purpose set forth.

In witness whereof I have hereunto set my hand, this 16th day of January, 1904, in the presence of the subscribing witnesses.

OLOF HJALMAR BERGSTROM.

Witnesses:
CARL J. SMITH,
WM. H. HOLMES.